United States Patent Office 3,530,581
Patented Sept. 29, 1970

3,530,581
NON-SLIPPING PLASTIC DENTURE
MATERIAL AND THE LIKE
Roy W. Whitney, Dayton, Ohio, assignor to Coe Laboratories, Chicago, Ill., a corporation of Illinois
No Drawing. Filed Mar. 13, 1967, Ser. No. 628,211
Int. Cl. A61c 13/00
U.S. Cl. 32—2         7 Claims

ABSTRACT OF THE DISCLOSURE

A slip resistant plastic composition particularly adapted for use in making dentures so that said denture is retained in the mouth in an improved manner. The compositions and articles are prepared by incorporating hard particles into a flowable plastic mass so they are distributed at least at the surface of the cured body of plastic surface which is intended to come in contact with another surface. The articles are preferably prepared by exposing a substantial portion of such particles towards the surface to improve the retention of the article in the mouth.

---

The invention relates to new plastic compositions in which slippage is reduced when the bodies of such cured plastic compositions are brought into contact with other surfaces. The invention particularly relates to articles formed from such plastic compositions, particularly denture appliances. The invention also relates to methods for preparing such compositions and articles.

It is generally desirable to provide improved plastic bodies which exhibit a reduced tendency to slip or lose retention when placed in contact with various surfaces. Such cured plastic bodies may take various article forms such as floor tiles and shoe heels and soles, for example. The disclosure of this invention, however, will be particularly directed to a teaching of plastic compositions which can be used to make full and partial denture articles which come into contact with moist, movable tissue, such as the palate.

A common means which is used to improve the retention of plastic dentures in the mouth is a denture adhesive. So-called liners are also widely used to improve the comfort retention and stability of the denture. The use of such means has many and serious disadvantages, not among the least of which is its inability to uniformly lead to successful retention of the denture in the mouth. Among other disadvantages is the esthetic unpleasantness of repeatedly applying the adhesive to the denture, and the inconvenience of handling the ointment-like adhesives.

Those who construct and wear artificial dentures appreciate the advantages of a slip resistant denture appliance. Even under the most favorable conditions, dentures constructed by conventional methods will slide, glide, move, slip, skid and become accidentally dislodged. Such dentures are often difficult to retain in the mouth because of unfavorable conditions such as anatomical features, lack of capillary attraction, and the nervous habits of the patient. Under these circumstances, dentures will not function efficiently or comfortably and will cause great embarassment and pain to the patient.

In an effort to stabilize dentures more permanently, other devices and technics have been employed including magnets, suction cups, springs, surgical implants, etc. The use of these devices and technics has often been costly and has sometimes demanded great professional skill. The present invention does not add to the cost of constructing the denture, nor does it involve the use of technics and procedures not familiar to all dental practitioners.

Accordingly, it is one object of this invention to provide new plastic compositions which can be cured to form various articles which exhibit the property of reduced slippage and enhanced retention when brought into contact with a nominally slip resulting surface which may be wet.

A particular object of this invention is a plastic denture article which can be used in the mouth and be retained in the mouth in an improved manner over conventional plastic dentures.

Still another object of this invention is to provide packaged resin combinations which are adapted to be cured into bodies which have the slip resistant characteristics of the foregoing type. This object is further served by providing packaged combinations of resins which are adapted to be mixed and to form plastic dentures which exhibit the desirable property of resistance to slippage.

A still further object of this invention is to provide a method by which improved slip resistant plastic bodies may be formed, and which method may be practiced without an undue number of process steps or without unreasonable expense which would tend to make the attainment of the articles a commercially unattractive pursuit.

Another object is a plastic denture which tends to resist slippage by having incorporated, at least at the surface of the denture, particles which are harder than the plastic. Such an object is particularly realized by exposing a substantial portion of said particles by removing the plastic from them towards the surface of the article.

A still further object is to provide a cured denture liner or sheet which is adapted to be conformed to a pre-existing plastic denture, and which liner can be used to enhance the retention of the denture in the mouth. Such a liner will have particles distributed at least along the surface thereof, and also a substantial portion of such particles may be exposed by removing plastic from around said particles.

All of the foregoing objects are realized as well as other objects which will occur to practitioners from considering the following disclosure of the invention.

In the denture art, plastic dentures are commonly formed from acrylics. A popular way of forming such dentures is by mixing a dry alkyl methacrylate together with a liquid methacrylate monomer. While the foregoing resin is one of popular choice, various other resins may be employed, such as the ethylenically derived vinyl acetates and vinyl chlorides. Outside the denture area, various plastics which are known in the art can be used to prepare the new compositions of this invention.

In general, the plastic compositions are prepared by incorporating therein a sufficient amount of hard particles. In general use, the plastic compositions which are cured into firm bodies have the particles distributed at least along the surface of the body which is adapted to come into contact with another surface. In general use, it is preferred that a major portion or substantial amount of the particles along said surface be exposed by removing the plastic which covers such particles because retention and non-slippage has been found to be markedly improved.

This invention provides that the cured plastic body be substantially rigid and hard after curing. The hard rigid body facilitates the subsequent step of plastic removal from a substantial portion of the particle aggregates at the surface of the body. The hardness and rigidity of the plastic body makes it easier to remove such plastic by abrasive means which are brought into contact with the cured plastic body. The rigidity and hardness of plastic bodies, such as those which are dimensioned into the form of dentures, may be used to illustrate the rigidity and hardness which is usefully contacted with the abrasive means to expose a major portion of the particle aggregates in said body. In general, the term "non-elastomeric plastic bodies" conveniently serves to characterize the rigidity and hardness of the plastic bodies prepared accordingly to this invention.

In the denture art, it has been found that enhanced retention occurs by incorporating the particles into the molded denture article without necessarily exposing the articles, but it is preferred practice to also expose the articles because greater advantages are attained.

It is also preferred that the particles be present in those portions of the denture which come into contact substanially with the moist mucosal tissue of the palate, but not in those portions which come substantially into contact with the gums of the mouth. Accordingly, the improved denture article finds particular advantage in preparing upper dentures which come into contact with the palate of the upper mouth.

The invention utilizes the technics usually employed for the processing of dentures, and the invention provides that preferably only those portions of the denture be altered that will contact the moist and movable mucosal surfaces. Conventional procedures and materials may be used to prepare the denture which will be altered. For convenience, the conventional steps employd in preparing dentures may be outlined as follows:

(1) An impression or reproduction is made of the area of the mouth on which the denture rests.

(2) The impression of the mouth may be considered as a negative mold and a positive mold of that impression is formed in plaster or artificial stone, the so-called casts.

(3) A denture is constructed in wax on the positive mold in the form in which plastic denture will be produced.

(4) The wax denture and the positive reproduction or mold of the mouth are invested or placed in plaster or artificial stone that is confined in a container or flask.

(5) When the plaster or artificial stone is hardened, it is placed with the waxed denture in warm water to soften and remove the wax. A positive reproduction of the mouth and the teeth remains in the flask, and this serves as a mold to process the plastic denture.

(6) The space in the flask occupied by the wax is packed or filled with the resin or "plastic dough" that will be cured or process in the form of the finished denture.

It is at this point that the slip resistant denture is preferably made. In packing or filling the mold with resin, a space is reserved for a thin layer of the slip resistant plastic composition. The packed resin will also be referred to as a packed or denture resin layer. The slip resistant plastic composition may be prepared in one way by mixing the particles with the solid resin component until the particles are thoroughly distributed therethroughout, and then adding the liquid component with mixing. The resulting "plastic dough" may then be formed into the thin layer which is deposited in the reserved space of the molded but uncured denture layer. The slip resistant plastic composition may also be sprayed or poured onto the resin denture layer while it is still in its plastic or substantially uncured state.

Still another way of practicing the invention is to provide cured liners or sheets having the particles distributed therethroughout and, optionally, exposing the major portion of said particles in the liner. The liners may be of the type now available for relining dentures, and may be formed by casting sheets of the resin, with the particles, to predetermined thickness.

The sheets may then be bonded to the denture by conventional bonding agents. If the liner is not exacly dimensioned to the denture, the excess may be removed by trimming or the like.

An alternative way to practice the invention is to combine the hard particles with the plastic dough which is used to pack the flask. In this embodiment, no space need be reserved for laminating additional layers. The denture may be finished, and the tissue contact surface thereof may then be sandblasted or treated in an equivalent manner to obtain the matte surface.

The desired matte surface or finish is defined for the purposes of this invention as a generally smooth surface to the touch, but one which is irregular and free from gloss or shine as contrasted with a surface which is not sandblasted or the like. The actual characteristics of the matte finish will to a large extent depend on the size and concentration of the hard particles which have been exposed by substantially removing their cured skins. Any operable abrasive means are brought into contact with the entire or substantial portions of the tisue contact surface of the denture to a sufficient degree of action until the desired matte surface is obtained. It is clear that the degree of action will involve a shorter contact time with a powered sandblasting gun than with a manually operated Carborundum sheet, for example.

The matte finish of the denture appliance is well tolerated by the mucosal tissue. While the explanation for the improved retention of the dentures of the invention are not known with certainty, it is believed that the oral fluids, the saliva, cooperates towards attaining this effect.

A thin layer of the fluid is believed to form a bonding action between the denture and the soft mucosal tissue of the mouth. Such a thin layer of fluid is believed to exert an improved adhesive action with the matte finish of the denture. It is further believed that the hard particles at the tissue contact surface contribute to forming a particularly improved matte surface, and may further cooperate in an anchoring action or the like with the mucosal tissue. In any event, a surprising and improved retention is obtained.

The tearm "particles" or "hard particles" covers various inorganic mineral fillers such as silica, porcelain, aluminum oxide, other metal oxides or compounds, ground ceramic, powdered metals, Carborundum, diamond dust, ground glass, ground walnut or other nut shells and the like. Various organic particles may also be used such as Teflon or high density polypropylene. It is only required that the particles be harder than the plastic material which makes up the denture so that said particles may be exposed following removal of the plastic skin by the abrasive means. It is not desirable that such particles be worn substantially down or broken by treatment with the abrasive.

The particles may be selected from a variety of sizes. In general, sizes which are too small should be avoided because a tendency develops for losing retention, and sizes too large should be avoided because of the possibility of losing retention and of the possibility of causing some physical irritation. The sizes may be readily determined by the practitioner. In general, mesh sizes of about 100 to about 250 may be used and a preferred range is from about 130 to about 200 mesh.

The particles are added in various amounts to the plastic body, say, from about 10% by weight to about 30% by weight. Amounts substantially below 10% tend to be characterized by increasing loss of retention and amounts above 30% by weight tend to result in objectionable "powdery" surfaces in which the excess particles may be dislodged in use.

The following examples are presented to teach various embodiments of practicing the invention, but none of such examples are intended to represent exclusive embodiments.

EXAMPLE I

A package resin composition is prepared by placing 10 grams of methyl methacrylate polymer powder in one container, and 5 cc. of methyl methacrylate monomer, in a separate container. To the solid resin component is added 20%, by weight, of 140 mesh silica powder, and the solid resin and silica are thoroughly mixed to obtain a good distribution of the silica in the resin powder.

The contents of the respective packages are mixed and the plastic composition mixture is cast into a small mold to obtain a disc-shaped body of cured plastic having distributed therethroughout the silica particle aggregates. The cured plastic body is a rigid body of plastic, and the surface of the rigid body is sandblasted, with a tool supplied by the J. F. Jelenko Company, New York. The outlet of the tool is held about three inches from the surface of the plastic body and the line pressure of the tool drops to 55–60 lbs. during operation. The plastic body is sufficiently rigid so that the sandblasting stream exposes a major portion of the particle aggregates at the surface following a blasting time of about 10–15 seconds.

EXAMPLE II

A series of upper plastic dentures are made for a number of subjects by using a solid component of methyl methacrylate polymer and liquid component of methyl methacrylate monomer to form the plastic dough for packing the dental flasks. The conventional procedures, previously outlined, are followed to form the denture layer, and then a layer is laminated in the reserved space.

The denture is formed with the handle on the bottom through which a hole is drilled so that a cord can be secured. To the other end of the cord, a container is attached which is adapted to receive different weights of pumice powder to test the retention of the denture within the mouth.

Replicate acrylic laminated layers are made from the same mold and these include laminated layers, some of which are controls, and some of which include various amounts of hard particles. Some of the dentures with particles are exposed by sandblasting in a manner similar to that shown in Example I. A comparsion may then be made on the same subject of the retention of dentures of conventional methacrylates and methacrylates containing hard particles, the major portion whereof are exposed by the method described in Example I. The weight of the pumice which dislodges the denture is recorded as shown in the following table:

|  | 1. No sand blasting, lbs. | 2. Increase over #1, percent | 3. Sand blasted, lbs. | 4. Increase over #1, percent | Comment |
| --- | --- | --- | --- | --- | --- |
| Sugject A, control | 8 |  | 12 | 50 | Medium size denture. |
| Porcelain 150 mesh | 11 | 38 | 18 | 125 |  |
| Silica 140 mesh | 12 | 50 | 21 | 163 |  |
| Silica 400 mesh | 11 | 38 | 20 | 150 |  |
| Silica 140 mesh; 400 mesh | 9 | 12 | 15 | 88 | 1:1 of 140 and 400 mesh. |
| Subject B, control | 1 |  | 7 | 600 | (¹) |
| Porcelain 150 mesh | 8 | 800 | 12 | 1,100 |  |
| Subject C, control | 3 |  | 7 | 134 | Small denture. |
| Porcelain 150 mesh | 6 | 50 | 13 | 334 |  |

¹ Small denture control retention of less than 1 lb. est.

The foregoing table shows an increase in retention of the denture by adding the hard particles, even without exposure of the particles by sandblasting. Exposure of the particles by sandblasting, however, markedly increased the retention of the denture and is the recommended and preferred practice. The porcelain and silica do not differ materially in their retentive properties, and the mesh size of the particles, within the tested range, do not materially affect the retention. The smaller dentures show an expected greater retention under the test conditions than the the larger denture.

The plastic dentures show resistance to slippage, both, when particle aggregates are added to the plastic body, and when the particles are exposed by abrasive action. Other plastic bodies which tend to resist slippage are required to have the major portion of the particles exposed by abrasive means because such plastic bodies are contacted with surfaces which do not possess the unique properties of mucosal tissue. It is therefore provided that such plastic bodies always have their particle aggregates exposed by removal of the plastic, and these latter plastic bodies include those which come into contact with non issue surfaces such as floors and other supports such as table or the like.

I claim:
1. A plastic denture including
   a body of substantially rigid and cured plastic in the conformation of a denture dimensioned for application to a subject, and
   particles distributed at least along the tissue contacting surface of the denture, such particles being harder than said plastic, at least a major portion of said hard particles being at least partly freed of the cured plastic, said hard particles being present in said plastic in an amount from about 10% by weight to an amount about 30% by weight of said plastic material, and the size of said hard particles being from about 100 mesh to about 300 mesh.
2. A plastic denture article as in claim 1 wherein said denture conformation is a first denture layer, and said tissue contacting surface is a second layer laminated to said first layer.
3. A plastic denture article as in claim 2 wherein said hard particles are present in said second layer in an amount of about 10% to about 30% by weight of the body of cured plastic in said second layer.
4. A plastic denture article as in claim 3 wherein said hard particles have a mesh size from about 100 to about 300.
5. A plastic denture article as in claim 4 further characterized in that the particles are silica.
6. A plastic denture article as in claim 4 wherein he plastic body is formed from methyl methacrylate.
7. A method of preparing a substantially rigid and cured plastic body in the conformation of a denture which resists slippage, including the steps of
   mixing particles harder than the plastic with a solid resin material,
   mixing a solid resin material with a liquid material which will cure said solid resin material,
   forming a first denture resin layer in the form of a denture prosthesis from said mixture of solid and liquid materials by curing said mixture until becomes a body of rigid plastic,
   combining particles harder than the cured plastic body with a solid resin material,
   combining the mixture of particles and solid resin material with a liquid resin material which will cure said solid resin material,
   preparing a second denture layer from said mixture of said hard particles, solid resin material and liquid resin material,
   laminating said second denture layer to said first layer to form a tissue contacting surface on said denture prosthesis and
   forming a matte finish on said second layer by contacting said layer with an abrasive means to a sufficient degree of action so that said matte finish is smooth to the touch, but irregular and free from gloss.

References Cited

UNITED STATES PATENTS 310,233   1/1885   Spyer _____ 32—3
652,751   6/1900   Daly _____ 32—2

ROBERT PESHOCK, Primary Examiner